United States Patent
Ueda et al.

[11] Patent Number: 5,213,947
[45] Date of Patent: May 25, 1993

[54] OPTICAL RECORDING MEDIUM

[75] Inventors: Yutaka Ueda, Yokohama; Eiji Noda, Kawasaki, both of Japan

[73] Assignee: Ricoh Company, Ltd., Tokyo, Japan

[21] Appl. No.: 665,010

[22] Filed: Mar. 5, 1991

[30] Foreign Application Priority Data
Mar. 6, 1990 [JP] Japan .................. 2-52636

[51] Int. Cl.$^5$ .................. G11B 7/00; G03C 1/00
[52] U.S. Cl. .................. 430/271; 430/495; 430/945; 428/64; 428/65; 522/96
[58] Field of Search .................. 430/945, 495, 271; 428/64, 65; 522/96

[56] References Cited

U.S. PATENT DOCUMENTS

| | | | |
|---|---|---|---|
| 4,668,550 | 5/1987 | Tajima et al. | 430/945 |
| 4,711,798 | 12/1987 | Ueda et al. | 430/945 |
| 4,861,637 | 8/1989 | Ueda et al. | 430/945 |
| 4,889,757 | 12/1989 | Horigome et al. | 428/64 |
| 5,011,560 | 4/1991 | Nakai et al. | 522/96 |
| 5,132,960 | 7/1992 | Hosokawa et al. | 430/495 |

FOREIGN PATENT DOCUMENTS 61-118416 6/1986 Japan .................. 522/96

Primary Examiner—Charles L. Bowers, Jr.
Assistant Examiner—M. Angebranndt
Attorney, Agent, or Firm—Cooper & Dunham

[57] ABSTRACT

An optical recording medium comprising a pair of concentrically-positioned disk-shaped polycarbonate substrates with a recording layer on a single surface of at least one of these substrates, wherein the substrates are formed into a sealed configuration with the recording layer on the inside, either with or without an inner peripheral spacer and an outer peripheral spacer, using an adhesive which comprises a compound of formula (I), a compound of formula (II)-A or (II)-B, and a compound of formula (III) as specified in the specification.

4 Claims, 1 Drawing Sheet

OPTICAL RECORDING MEDIUM

BACKGROUND OF THE INVENTION

1. Field of the Invention

The present invention relates to an optical recording medium of an air-sandwich sealed type, which comprises a pair of concentrically-positioned disk-shaped polycarbonate substrates with a recording layer on a single surface of at least one of these substrates, which is constructed in such a configuration that the recording layer is provided on the inside, either with or without an inner peripheral spacer and an outer peripheral spacer, using a particular adhesive.

2. Discussion of Background

In order to ensure that there is no effect on the enclosed recording material in a disk-shaped information recording medium, adhesives used for sealing this kind of information recording medium are required to satisfy the following conditions: (1) no byproducts are formed during the curing process of the adhesive, and (2) no solvents are contained in the adhesive. For these reasons, epoxy-type adhesives are usually used. However, problems arise inasmuch as a plastic substrate of the recording medium undergoes deformation when epoxy-type adhesives are cured under application of heat thereto, and the curing takes considerable time. Cold-setting epoxy adhesives which are curable at room temperature have also been proposed, but the problem of a long curing period still exists with this type of adhesive.

Accordingly, considerable attention has been focused on ultraviolet-curable adhesives in recent years. These adhesives can satisfy the above conditions (1) and (2). However, in the case where a polycarbonate is used for a substrate of the disk-shaped recording medium, it is necessary to use the adhesive comprising a low-molecular-weight monomer which can dissolve polycarbonate to a certain degree to obtain adequate adhesion to the polycarbonate. Because this type of monomer is generally highly volatile, there is the problem, especially in the so-called air-sandwich type disk-shaped recording medium, that the low-molecular-weight monomer component volatilizes in the enclosed portion within a short time before the curing of the adhesive is completed. This has an adverse effect on a recording layer of the recording medium.

The inventors of the present invention have intensely investigated a large number of adhesives for sealing optical recording media and have discovered that the compound having the following general formula (I) shows superior adhesion to the polycarbonate and has low volatility.

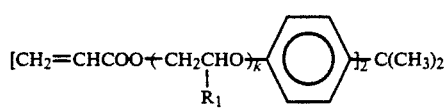

wherein k is an integer of 1 to 3.

Therefore, the inventors of the present invention have already proposed in Japanese Laid-Open Patent Application 63-20034 an adhesive containing the aforementioned compound as the adhesive for sealing the disk-shaped optical recording medium. In the above application, it was also stated that the adhesive strength of the adhesive can be effectively improved when the compound represented by the general formula (I) is used in combination with a so-called monofunctional monomer, which is an acrylate monomer having one acryloyl group ($CH_2$=CHCOO—) in one molecule, or a multifunctional monomer having two or more acryloyl groups in one molecule.

However, the above monofunctional or multifunctional monomers, which are mixed with the compound of formula (I), have comparatively low viscosity. When the above monomers are mixed with the compound (I) to prepare an adhesive, the viscosity thereof is too low, for example, about 100 cps, so that drawbacks remain, such as poor operability in using this material as a sealing adhesive.

SUMMARY OF THE INVENTION

Accordingly, an object of the present invention is to provide an optical recording medium using an adhesive which has excellent adhesion to polycarbonate, low volatility, a short curing time, and which exhibits superior operability, and does not cause deformation of a substrate.

The above object of the present invention can be achieved by an optical recording medium comprising a pair of concentrically-positioned disk-shaped polycarbonate substrates with a recording layer on a single surface of at least one of these substrates, wherein the substrates are formed into a sealed configuration with the recording layer on the inside, either with or without an inner peripheral spacer and an outer peripheral spacer, using an adhesive which comprises a compound of formula (I), a compound of formula (II)-A or (II)-B, and a compound of formula (III):

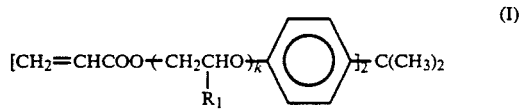

wherein $R^1$ represents hydrogen or a methyl group; and k is an integer of 1 to 3.

wherein l is an integer of 4 to 8.

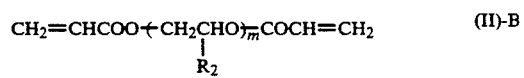

wherein $R^2$ represents hydrogen or a methyl group; and m is an integer of 3 to 9.

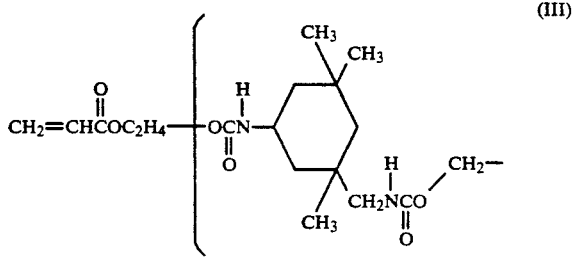

-continued

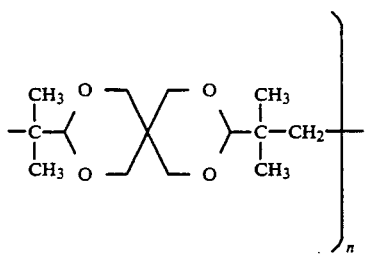

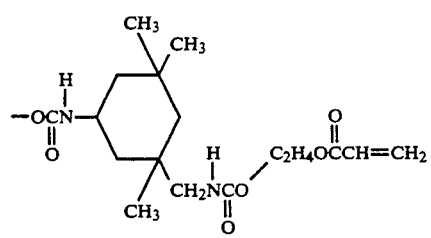

wherein n is an integer of 1 to 3.

DETAILED DESCRIPTION OF THE PREFERRED EMBODIMENTS

Figure 1:
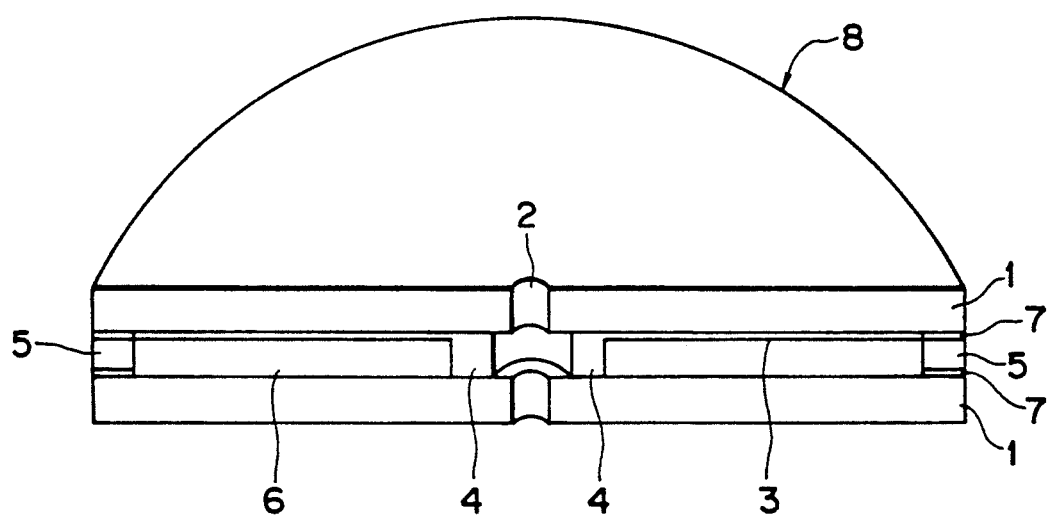
FIG. 1 is a cross-sectional view of one example of the optical recording medium according to the present invention.

As previously mentioned, the adhesive for use in the present invention comprises a compound of formula (I), a compound of formula (II)-A or (II)-B, and a compound of formula (III). In the present invention the above adhesive may further comprise a monofunctional monomer with a low volatility for the purpose of reducing the cure shrinkage of the adhesive during curing.

Examples of such monofunctional monomers are as follows:

(1) $CH_2=CHCOOCH_2CH_2O(-COCH_2CH_2CH_2CH_2.CH_2O)_{-n}H$ wherein n is an integer of 0 to 2.

(2) $CH_2=CHCOOCH_2CHOH$
   $\quad\quad\quad\quad\quad\quad\quad |$
   $\quad\quad\quad\quad\quad\quad CH_3$ (3) 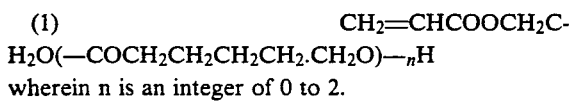

wherein n is an integer of 0 to 2.

(4) 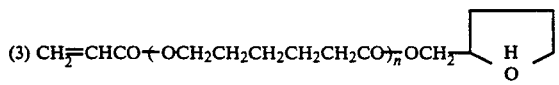

(m = 0~3, n = 0~12)

(5) $CH_2=CHCOO(-CH_2CH_2O)-_nC_2H_5$
wherein n is an integer of 1 or 2.

(6) $CH_2=CHCO(-OCH_2CH_2)_mOC_nH_{2n+1}$
wherein m is an integer of 2 or 3; and n is an integer of 1 to 4.

It is preferable that the amount ratio of the compound of formula (I), the compound of formula (II)-A or (II)-B, and the compound of formula (III) in the adhesive used in the optical recording medium according to the present invention be (30 to 70 wt. %) to (10 to 30 wt. %) to (10 to 30 wt. %).

The monofunctional monomer may be contained in the adhesive in the ratio of 0 to 30 wt. %. The adhesive for use in the present invention is prepared with addition of a photopolymerization initiator.

The sealed-type optical information recording medium of the present invention will now be explained with reference to FIG. 1.

A pair of disk-shaped substrates 1, 1 is made from, for example, polycarbonate by injection molding. An engaging hole 2 runs through the center of each substrate 1. An organic-dye-containing recording layer 3 is formed, for example, on one side of one of the substrates 1. The disk-shaped optical recording medium is constructed in such a fashion that the recording layer 3, which is attached to the substrate 1 with an adhesive 7 of the present invention, is turned to inside with a space 6 interposed therebetween, via an inner peripheral spacer 4 and an outer peripheral spacer 5 which are concentrically positioned.

Representative examples of the organic dye contained in the recording layer 3 include polymethine dyes such as a cyanine dye and a merocyanine dye. In addition, the organic-dye-containing recording layer may be replaced with a metallic film recording layer of Te or the like.

The recording layers 3 may be formed on the inner sides of both substrates.

Other features of this invention will become apparent in the course of the following description of exemplary embodiments, which are given for illustration of the invention and are not intended to be limiting thereof.

In the general formulas shown in the following Examples, the acryloyl group, $$CH_2=CHCO-\atop O$$

is designated as A for simplification.

EXAMPLE 1

A pair of disk-shaped polycarbonate substrates with a diameter of 130 mm and a thickness of 1.2 mm were prepared by injection molding. A solution of 0.7 wt % of an organic dye represented by the following formula, dissolved in a mixed solvent of methanol and 1, 2-dichloroathane (8:2), was spin-coated at 400 rpm on one of these substrates to provide a recording layer. The substrates were then formed into a sealed unit through a 0.5 mm thick spacer using an adhesive having the following formulation.

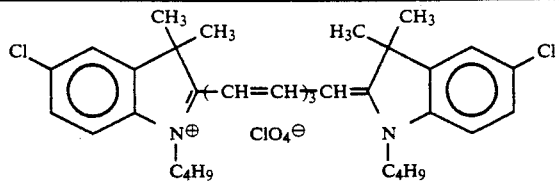

|  | Parts by weight |
|---|---|
| "Viscoat #700" made by Osaka Organic Chemical Industry Ltd. | 50 |

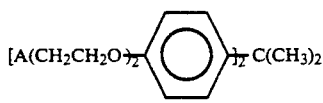

| | |
|---|---|
| "PEG 400DA" made by Nippon Kayaku Co., Ltd.) $A(CH_2CH_2O)_8 CH_2CH_2—A$ | 20 |
| Compound having formula (III) "UAS-10" made by Negami Kogyo Co., Ltd.) | 15 |

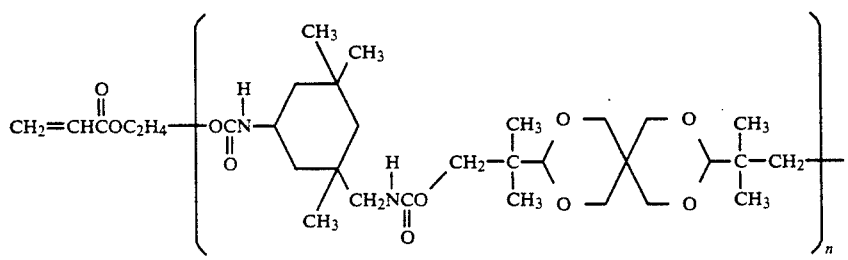

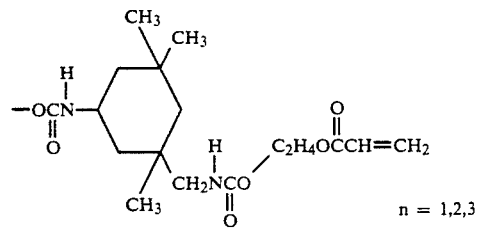

n = 1,2,3

| | |
|---|---|
| "TC-110S" made by Nippon Kayaku Co., Ltd. | 15 |

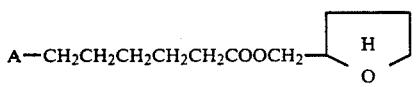

| | |
|---|---|
| 2,2-dimethoxy-2-phenylacetophenone (photopolymerization initiator) | 3 |

The above-prepared adhesive, which is of an ultraviolet curable type, was hardened by being exposed to ultraviolet light at an illuminance of about 30 mW/cm² for 30 seconds by use of a commercially available high pressure mercury lamp "Rapid Cure 2000" (Trademark), manufactured by Ushio Inc. Thus, disk-shaped optical recording medium No. 1 according to the present invention was prepared.

The disk-shaped optical recording medium thus prepared was allowed to stand under an environment of 60° C. and 90% RH for 1000 hours. Thereafter, the disk characteristics were measured. The results are given in Table 1.

EXAMPLE 2

The procedure for preparation of the disk-shaped optical recording medium employed in Example 1 was repeated except that the adhesive was replaced by the one with the following formulation, so that disk-shaped optical recording medium No. 2 according to the present invention was prepared.

|  | Parts by weight |
|---|---|
| "Viscoat #700" made by Osaka Organic Chemical Industry Ltd. | 40 |

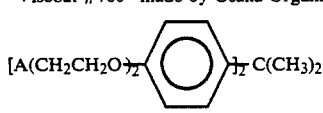

| | |
|---|---|
| "4EG-A" made by Kyoeisha Chemical Co., Ltd.) $A(CH_2CH_2O)_3CH_2CH_2—A$ | 20 |

|  | Parts by weight |
|---|---|
| Compound having formula (III) "UAS-10" made by Negami Kogyo Co., Ltd.) | 20 |

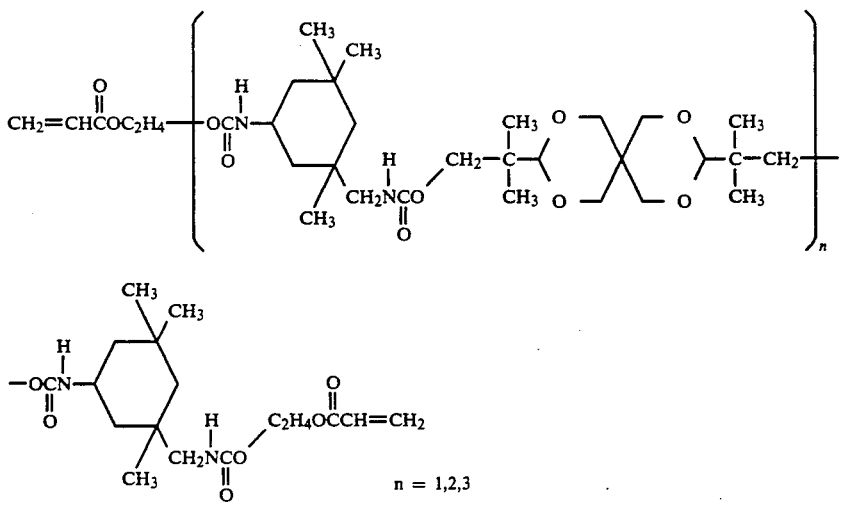

n = 1,2,3

| "FA-1" made by Daicel Chemical Industries, Ltd.<br>A—CH2CH2OCOCH2CH2CH2CH2CH2OH | 20 |
|---|---|
| 2,2-dimethoxy-2-phenylacetophenone (photopolymerization initiator) | 3 |

EXAMPLE 3

The procedure for preparation of the disk-shaped optical recording medium employed in Example 1 was repeated except that the adhesive was replaced by the one with the following formulation, so that disk-shaped optical recording medium No. 3 according to the present invention was prepared.

|  | Parts by weight |
|---|---|
| "Viscoat #700" made by Osaka Organic Chemical Industry Ltd. | 40 |

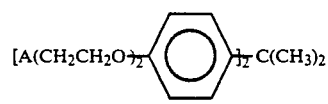

| "HDDA" made by Osaka Organic Chemical Industry Ltd.<br>A—(CH2)6—A | 20 |
|---|---|
| Compound having formula (III) "UAS-10" made by Negami Kogyo Co., Ltd.) | 20 |

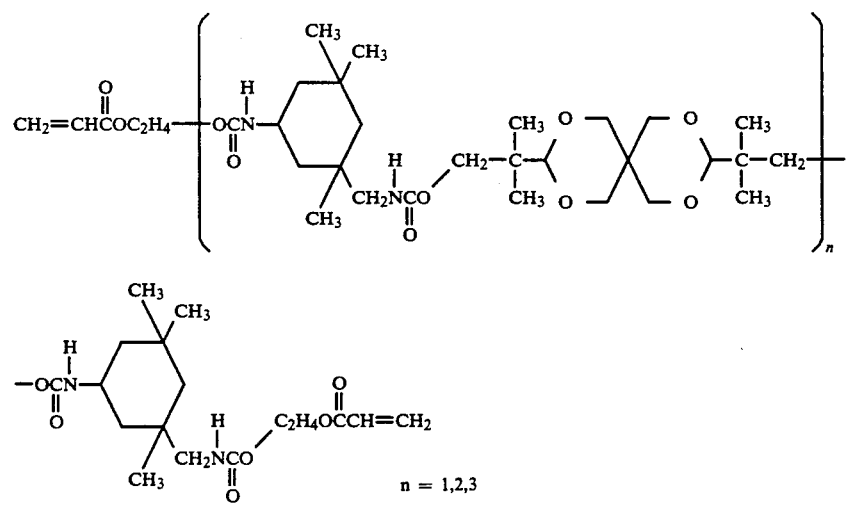

n = 1,2,3

| "FA-1" made by Daicel Chemical Industries, Ltd.<br>A—CH2CH2OCOCH2CH2CH2CH2CH2OH | 20 |
|---|---|

|  | Parts by weight |
|---|---|
| 2,2-dimethoxy-2-phenylacetophenone (photopolymerization initiator) | 3 |

EXAMPLE 4

The procedure for preparation of the disk-shaped optical recording medium employed in Example 1 was repeated except that the adhesive was replaced by the one with the following formulation, so that disk-shaped optical recording medium No. 4 according to the present invention was prepared.

-continued

|  | Parts by weight |
|---|---|
| 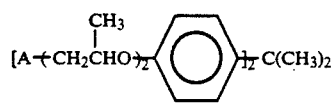 | |
| "BP-4PA" made by Kyoeisha Chemical Co., Ltd. | 50 |
|  | |
| "HDDA" made by Osaka Organic Chemical Industry Ltd. A$+$CH$_2\overline{)6}$A | 20 |
| Compound having formula (III) "UAS-10" made by Negami Kogyo Co., Ltd.) | 20 |
| 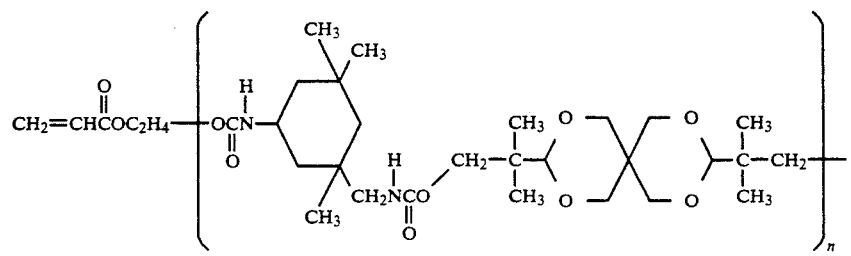 | |
| "Aronix M-111" made by Toagosei Chemical Industry Co., Ltd. | 10 |
| 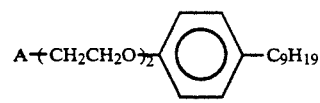 | |
| 2,2-dimethoxy-2-phenylacetophenone (photopolymerization initiator) | 3 |

COMPARATIVE EXAMPLE 1

The procedure for preparation of the disk-shaped optical recording medium employed in Example 1 was repeated except that the adhesive was replaced by the one with the following formulation, so that comparative disk-shaped optical recording medium No. 1 was prepared.

|  | Parts by weight |
|---|---|
| "Viscoat #700" made by Osaka Organic Chemical Industry Ltd. | 60 |
| "HDDA" made by Osaka Organic Chemical Industry Ltd. A$+$CH$_2\overline{)6}$A | 20 |
| "FA-1" made by Daicel Chemical Industries, Ltd. A—CH$_2$CH$_2$OCOCH$_2$CH$_2$CH$_2$CH$_2$CH$_2$OH | 20 |
| 2,2-dimethoxy-2-phenylacetophenone (photopolymerization initiator) | 3 |

COMPARATIVE EXAMPLE 2

The procedure for preparation of the disk-shaped optical recording medium employed in Example 1 was repeated except that the adhesive was replaced by the one with the following formulation, so that comparative disk-shaped optical recording medium No. 2 was prepared.

| | Parts by weight |
|---|---|
| "Viscoat #700" made by Osaka Organic Chemical Industry Ltd. | 40 |

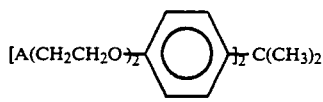

| | |
|---|---|
| "PEG 400DA" made by Nippon Kayaku Co., Ltd. $A+CH_2CH_2O)_{\overline{9}}CH_2CH_2-A$ | 20 |
| Compound having formula (III) "UAS-10" made by Negami Kogyo Co., Ltd. | 20 |

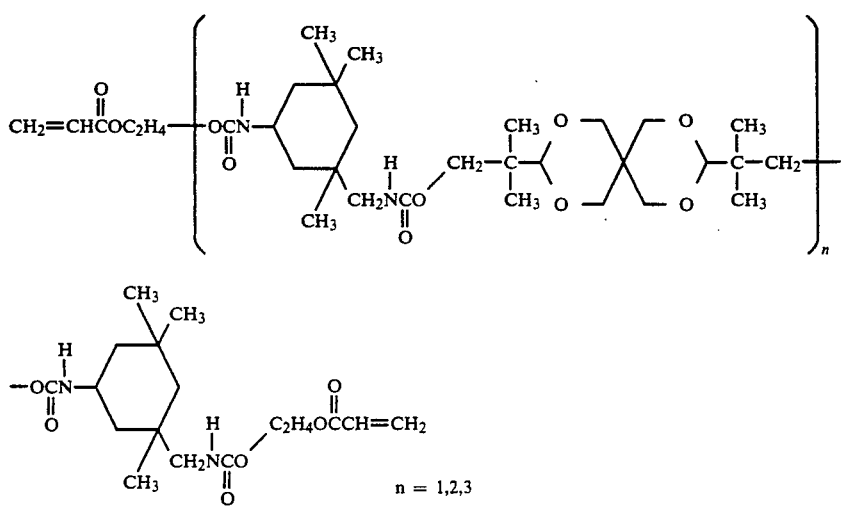

n = 1,2,3

| | |
|---|---|
| "THFA" made by Osaka Organic Chemical Industry Ltd. | 20 |

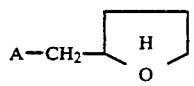

| | |
|---|---|
| 2,2-dimethoxy-2-phenylacetophenone (photopolymerization initiator) | 3 |

COMPARATIVE EXAMPLE 3

The procedure for preparation of the disk-shaped optical recording medium employed in Example 1 was repeated except that the adhesive was replaced by the one with the following formulation, so that comparative disk-shaped optical recording medium No. 3 was prepared.

| | Parts by weight |
|---|---|
| "Viscoat #540" made by Osaka Organic Chemical Industry Ltd. | 60 |

[A+CH₂CH₂O)₂—〈ring〉—C(CH₃)₂ with OH

| | |
|---|---|
| "PEG 400DA" made by Nippon Kayaku Co., Ltd. $A(CH_2CH_2O)_{\overline{9}}CH_2CH_2-A$ | 20 |
| "Aronix M-111" made by Toagosei Chemical Industry Co., Ltd. | 20 |

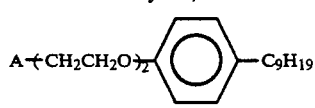

| | |
|---|---|
| 2,2-dimethoxy-2-phenylacetophenone (photopolymerization initiator) | 3 |

TABLE 1

| Example No. | Immediately after Preparation | | | 1000 Hours Later after Storage | | | Viscosity (cps at 25° C.) |
|---|---|---|---|---|---|---|---|
| | Reflectivity (%) | C/N (dB) | Repetition of Reproduction | Reflectivity (%) | C/N (dB) | Repetition of Reproduction | |
| Ex. 1 | 23.0 | 53 | 1,000,000 or more | 21.5 | 51 | 1,000,000 or more | 850 |
| Ex. 2 | 23.0 | 53 | 1,000,000 or more | 22.0 | 51 | 1,000,000 or more | 700 |
| Ex. 3 | 23.0 | 53 | 1,000,000 or more | 22.0 | 51 | 1,000,000 or more | 500 |
| Ex. 4 | 23.0 | 53 | 1,000,000 or more | 21.8 | 51 | 1,000,000 or more | 600 |
| Comp. | 23.0 | 53 | 1,000,000 or more | 22.0 | 51 | 1,000,000 or more | 120 |

TABLE 1-continued

| Example No. | Immediately after Preparation | | | 1000 Hours Later after Storage | | | Viscosity (cps at 25° C.) |
|---|---|---|---|---|---|---|---|
| | Reflectivity (%) | C/N (dB) | Repetition of Reproduction | Reflectivity (%) | C/N (dB) | Repetition of Reproduction | |
| Ex. 1 Comp. Ex. 2 | 23.0 | 53 | 10,000 | 15.0 | 48 | 10,000 or less | 450 |
| Comp. Ex. 3 | 23.0 | 53 | 1,000,000 or more | 21.5 | Peeled away during storage | | 2500 |

The substrates of the disk-shaped optical recording media according to the present invention as outlined above are not readily deformed and the preservability of the recording media is excellent when compared with the conventional optical recording media which are sealed with the conventional epoxy resin. In addition, it is possible to reduce the curing time while the disks are sealed so that the operability during adhesion is improved.

What is claimed is:

1. An optical recording medium comprising a pair of concentrically-positioned disk-shaped polycarbonate substrates with a recording layer on a singe surface of at least one of these substrates, wherein said substrates are formed into a sealed configuration with said recording layer on the inside, either with or without an inner peripheral spacer and an outer peripheral spacer, using an adhesive which comprises a compound of formula (I), a compound of formula (II)-A or (II)-B, and a compound of formula (III):

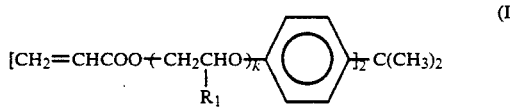
(I)

wherein R¹ represents hydrogen or a methyl group; and k is an integer of 1 to 3;

(II)-A wherein l is an integer of 4 to 8;

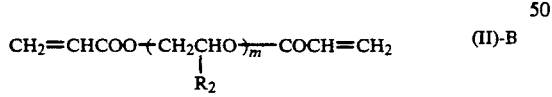
(II)-B wherein R² represents hydrogen or a methyl group; and m is an integer of 3 to 9;

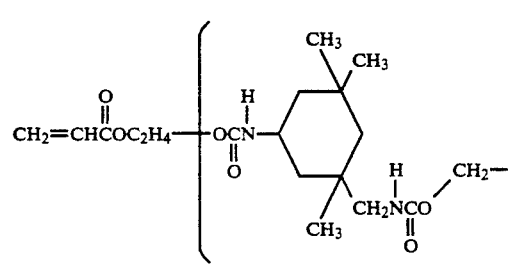
(III)

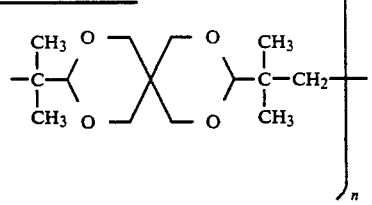

wherein n is an integer of 1 to 3, with a photopolymerization initiator.

2. The optical recording medium as claimed in claim 1, wherein said adhesive further comprises a monofunctional monomer selected from the group consisting of:

(1) $CH_2\!=\!CHCOOCH_2CH_2O(-COCH_2CH_2CH_2CH_2.CH_2O)_n\!-\!H$ wherein n is an integer of 0 to 2,

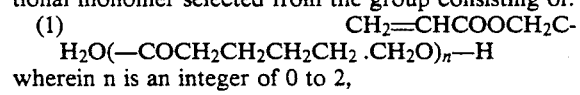

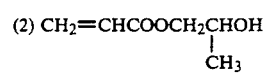

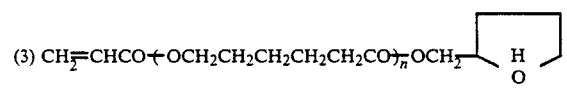

wherein n is an integer of 0 to 2,

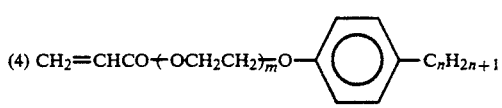

(m = 0~3, n = 0~12)

(5) $CH_2\!=\!CHCOO(-CH_2CH_2O)_n\!-\!C_2H_5$
wherein n is an integer of 1 or 2, and (6) $CH_2\!=\!CHCO(-OCH_2CH_2)_m\!-\!OC_nH_{2n+1}$
wherein m is an integer of 2 or 3; and n is an integer of 1 to 4.

3. The optical recording medium as claimed in claim 2, wherein the amount ratio of said monofunctional monomer is in the range of 0 to 30 wt. % of said adhesive.

4. The optical recording medium as claimed in claim 1, wherein the relative proportions of said compounds in said adhesive are as follows: said compound of formula (I), 30 to 70 wt. %; said compound of formula (II)-A or (II)-B, 10 to 30 wt. %; said compound of formula (III), 10 to 30 wt %.

* * * * *